(12) United States Patent
Louw et al.

(10) Patent No.: US 11,528,286 B2
(45) Date of Patent: Dec. 13, 2022

(54) NETWORK VULNERABILITY DETECTION

(71) Applicant: F-Secure Corporation, Helsinki (FI)

(72) Inventors: Jacques Louw, Helsinki (FI); Keith Kirton, Helsinki (FI)

(73) Assignee: WITHSECURE CORPORATION, Helsinki (FI)

(*) Notice: Subject to any disclaimer, the term of this patent is extended or adjusted under 35 U.S.C. 154(b) by 75 days.

(21) Appl. No.: 15/931,285

(22) Filed: May 13, 2020

(65) Prior Publication Data

US 2020/0366695 A1 Nov. 19, 2020

(30) Foreign Application Priority Data

May 14, 2019 (GB) ..................................... 1906770

(51) Int. Cl.
*H04L 9/40* (2022.01)
*H04L 67/1097* (2022.01)
*H04L 61/4523* (2022.01)

(52) U.S. Cl.
CPC ...... *H04L 63/1425* (2013.01); *H04L 61/4523* (2022.05); *H04L 63/1433* (2013.01); *H04L 67/1097* (2013.01)

(58) Field of Classification Search
CPC ............. H04L 61/1523; H04L 63/1416; H04L 63/1433; H04L 67/1095; H04L 41/0813; H04L 41/0846; H04L 63/1425; H04L 67/1097; H04L 63/1441; H04L 63/1408; H04L 41/0681; H04L 63/1466; G06F 21/564; G06F 21/565; G06F 21/554; G06F 21/577; G06F 21/552; H04W 48/08
See application file for complete search history.

(56) References Cited

U.S. PATENT DOCUMENTS

| 7,200,869 B1* | 4/2007 | Hacherl ............. G06F 12/1433 726/27 |
| 7,530,104 B1* | 5/2009 | Thrower ............... G06F 21/554 713/188 |
| 9,882,784 B1 | 1/2018 | Lotfi |
| 10,192,052 B1* | 1/2019 | Singh .................... G06F 21/562 |
| 2008/0271025 A1 | 10/2008 | Gross et al. |
| 2009/0271863 A1* | 10/2009 | Govindavajhala ......................... H04L 63/1433 726/23 |
| 2015/0370885 A1* | 12/2015 | Kushmerick ........... H04L 41/40 707/737 |
| 2016/0028751 A1* | 1/2016 | Cruz Mota ......... H04L 63/1408 726/23 |

(Continued)

OTHER PUBLICATIONS

International Search Report for GB1906770.1 dated Oct. 9, 2019.

*Primary Examiner* — Tonia L Dollinger
*Assistant Examiner* — Linh T. Nguyen
(74) *Attorney, Agent, or Firm* — Thomas | Horstemeyer, LLP

(57) ABSTRACT

A method for monitoring a directory environment of a computer network to detect vulnerabilities. The method comprises, at a first computer on the computer network, changing a configuration of the directory environment and, with a replication service, replicating the change at a second computer on the computer network. The method further comprises extracting information relating to the change from the replication service and using the extracted information to detect a vulnerability in the directory environment.

19 Claims, 4 Drawing Sheets

(56) References Cited

U.S. PATENT DOCUMENTS

| | | | | |
|---|---|---|---|---|
| 2017/0161167 A1* | 6/2017 | Obermiller | ............. | G06F 16/25 |
| 2017/0299633 A1* | 10/2017 | Pietrowicz | .......... | H04L 63/1416 |
| 2017/0353453 A1* | 12/2017 | Hutchinson | ............. | H04L 63/20 |
| 2018/0046631 A1* | 2/2018 | Choi | .................. | G06K 9/00979 |
| 2018/0349219 A1* | 12/2018 | Berger | ................ | G06F 11/0784 |
| 2019/0138420 A1* | 5/2019 | Harutyunyan | ........ | G06F 11/301 |
| 2019/0149572 A1* | 5/2019 | Gorodissky | ......... | H04L 63/1433 |
| | | | | 726/25 |
| 2019/0281010 A1* | 9/2019 | Teverovsky | ........ | H04L 41/0631 |

* cited by examiner

NETWORK VULNERABILITY DETECTION

CROSS-REFERENCE TO RELATED APPLICATIONS

This application claims the benefit of and priority to G.B. Patent Application No. 1906770.1, filed on May 14, 2019, entitled "NETWORK VULNERABILITY DETECTION," the contents of which are incorporated by reference herein in their entirety.

TECHNICAL FIELD

The present invention relates to a method and system for monitoring a directory environment to detect vulnerabilities.

BACKGROUND

Active Directory (AD) is a Windows™ operating system (OS) directory service that facilitates working with different, interconnected and complex network resources. In particular, AD provides a common interface for organizing and maintaining information related to resources connected to a variety of network directories. The network directories may be, for example, systems-based (like Windows™ OS) directories, application specific directories, and/or resource specific directories (such as printers and/or other hardware directories).

As a directory service, AD consists of a database and corresponding executable code responsible for servicing access requests and maintaining the database. The executable part, referred to herein as a directory system agent, is a collection of services such as, for example, Windows™ services and processes.

AD may be described as having a hierarchical structure or framework made up of nodes. Each node is referred to as an object, the object being associated with either a resource, or a security principal. Examples of resources include: hardware connected to the network such as printers and computers, and virtual services made available through the network. Examples of security principals include user or computer accounts and groups thereof.

Each object is uniquely identified by a globally unique identifier ("GUID") also termed a universally unique identifier ("UUID") and may have a name and a set of attributes defining the characteristics and information that the object represents. The attributes may be set by a user-defined database schema that can be altered by an administrator of the network. For example, printers in a network might be required by a schema to specify the attribute of whether they do or don't have colour printing capabilities and/or whether special permission is required to use this capability. A user seeking to print in colour without special permission may then use AD to search based on these object attributes to find a suitable colour printer resource. Whilst each object represents a single entity, objects may contain other objects.

Objects in AD may be grouped into domains which are identified by their domain name system (DNS) name structure, the namespace. Collections of one or more domains are called trees. Collections of trees are called a forest. The forest represents the security boundary within which objects in the network are accessible, and may also be described as an AD environment.

FIG. 1a is a schematic representation of a known directory environment. A plurality of objects 100a-100i is grouped into a plurality of domains 101a-101d. Two of the domains 101a, 101b belong to a first tree 102a and two of the domains 101c, 101d belong to a second tree 102b. The two trees make up a forest 103 and represent the boundary of AD environment. Typically, any number of objects, domains and trees may be present in an AD environment. In some cases an AD environment may also include multiple forests.

FIG. 1b is a schematic representation of the known directory hierarchical structure of FIG. 1a but illustrated using connected nodes.

In order to control which objects are permitted access to or trusted by others, AD typically uses trust and privilege policies. For example, in a one-way trust policy, objects in one domain are permitted access to objects in another specified domain, but not the other way around. In a two-way trust policy, objects in two specified domains are permitted access to each other. In a transitive trust policy, objects in multiple domains are permitted access to each other. Similar trust and privilege policies may be provided in relation to objects accessing and trusting each other within a single AD domain. These and other types of trust policies provide an administrator of the network with a high level of flexibility to set up access and control privileges throughout the network. A control relationship which permits one object to access and/or control another and use this to elevate its privileges within the network is called a control path. Whilst control paths are necessary to help the administrator manage the network, if they can be discovered by an attacker, the attacker may use them to elevate his privileges and cause damage to the network (e.g. steal, destroy, access, install malware, etc.). It is therefore important to ensure that any AD environment configurations resulting in vulnerable and/or exposed control paths are detected and eliminated.

Objects in the AD database may be accessed by using lightweight directory access protocol (LDAP). LDAP is an open, industry standard application protocol for accessing and maintaining distributed directory information services over an internet protocol (IP) network.

Typically, a client on the network starts an LDAP session by connecting to an LDAP server running an LDAP service on the network. The client queries the LDAP service by sending an operation request to the LDAP server. The LDAP server sends responses in return. For example, a user seeking to print in colour without special permission may start an LDAP session on his client which connects to an LDAP server running an LDAP service. The client sends an operation request to search for objects with the attributes indicating colour printing capability without requiring special access permission. The LDAP server performs the search and returns the results. Typically, the LDAP server also provides a central place to store usernames and passwords, where they can be used by the LDAP server to authenticate client operation requests.

Example operation requests include: add (inserting a new entry such as an object or attribute into the AD database), delete (delete an entry in the AD database), search (search the AD database based on user-chosen object attributes), compare (compare objects in the AD database), modify (edit an entry in the AD database) and bind. In a bind operation, the authentication of a client which connects to the LDAP server is determined. For example, initially the client might be unauthenticated when the operation request is made and the client connects to the LDAP server. Following the bind operation, the client is given an authenticated status. Typically, as part of the bind operation, the LDAP server will check a username and password provided by the client against the username and password stored centrally on the LDAP server.

Given that almost all services, processes, and hardware that operate in network environments make use of AD and LDAP, any user in an AD domain querying the LDAP service running on the LDAP server is able to extract information about almost all AD objects in the AD database. The types of information which may be extracted include object attributes, trust policies and object privileges (i.e. which users and resources have which privileges), and in some cases even usernames and passwords. This type of information is extremely useful to an attacker attempting to escalate his privileges. For example, if he is able to determine from the extracted information that a particular user account has access to and control over a given first AD object which is trusted by a second AD object, he can plan an attack path to the second AD object via that user account and via the first AD object. In other words, the extracted information may be used to proactively identify exploitable configurations and weaknesses (i.e. vulnerable control paths) in an AD environment.

A known tool to map an AD environment is BloodHound. BloodHound uses graph theory to reveal hidden and often unintended privilege relationships within an AD environment. An attacker may use BloodHound and similar tools to easily identify highly complex attack paths that would otherwise be impossible to quickly identify. An administrator (described herein as a defender) may similarly use BloodHound and similar tools to proactively identify these potential attack paths so that they can be closed.

As described above, one important element to finding successful attack paths is finding vulnerable control paths (i.e. an aggregation of control relationships between objects in the network such as users, computers, and groups of objects). Control paths may be visualised as graphs and may be used to determine, for example but not limited to, which entity can obtain which domain admin privileges, which entity can control which resources, and even which entity has access to certain email accounts.

For example, with reference to FIG. 1b, it may be that a first object 100a in a first domain 101a is a user account with access to sensitive emails which an attacker wishes to steal and/or destroy. The attacker has managed to obtain control of a second object 100c in a second domain 101b. The second object 100c does not have direct access to or control over the first object 100a. However, the attacker is able to extract information from AD that indicates that the second object 100c is in a two-way trust policy relationship with a second object 100b in the first domain 101a, and this second object 100b has admin privileges in the first domain 101a. This set of relationships that were not apparent without extracting information from the AD environment and LDAP service provides a control path based on a configuration weakness which the attacker may exploit to escalate his privileges, and obtain access to and destroy the emails of the first object 100a.

In order to extract the necessary information and determine control paths, tools such as BloodHound typically take a snapshot of the AD environment by initiating an LDAP data dump.

The information provided in the LDAP data dump includes, amongst other information, object names and attributes, and their relation in the AD database to other objects. This information can be input into known graph generating software to map out the complete AD environment, such as the graph representation shown in FIG. 1b.

This traditional "snapshot" approach of extracting information through an occasional LDAP data dump is the preferred approach of attackers because it does not normally require any special permissions or privileges to initiate.

Defenders traditionally adopt the same "snapshot" approach to find vulnerable control paths in the AD environment and fix them when they are detected. Once a vulnerable control path is detected and fixed, the defenders may initiate a second LDAP data dump to verify the efficacy of any fixes.

Both these defensive use-cases (ongoing monitoring and verifying fixes to the AD environment) require repeated LDAP data dumps, and repeatedly performing the steps of importing and processing the data in graph generating software to map the AD environment. These steps typically take a day or more to complete because the volume of data obtained in an LDAP data dump is very large and takes significant computing resources to process. Defenders therefore typically employ daily snapshots. Using this approach, the defenders can identify issues and implement fixes based on a snapshot of one day but must wait until the snapshot of the next day to verify that their changes have resolved the vulnerability, for example by eliminating a configuration weakness.

A problem with this traditional snapshot method is that it only permits the detection of vulnerabilities present at the time of the snapshot. Sometimes, vulnerabilities may only be temporary, short-lived and/or present under certain specific conditions which did not apply at the time of a snapshot. An example of such a vulnerability may be one introduced by scheduled tasks which only occur at specific times not captured during the snapshot. In such circumstances, the vulnerability remains undetected.

Even if a vulnerability is detected, waiting a day or more to determine if a fix has worked may leave networks exposed to attackers if the vulnerability takes more than a single round of fixes.

Other types of directory environments other an AD environments also exist and suffer from the same vulnerabilities. For example, in a Linux operating system, FreeIPA provides a similar functionality. In IOS, an example directory environment is Apple Open Directory. These and other directory environments suffer from the same vulnerabilities.

An improved method for monitoring directory environments to detect vulnerabilities is required.

SUMMARY

According to a first aspect of the invention, there is provided a method for monitoring a directory environment of a computer network to detect vulnerabilities. The method comprises, at a first computer on the computer network changing a configuration of the directory environment, with a replication service replicating the change at a second computer on the computer network, and extracting information relating to the change from the replication service and using the extracted information to detect a vulnerability in the directory environment.

According to an embodiment, the first computer is a first domain controller and the second computer is a second domain controller.

According to an embodiment, the step of extracting the information from the replication service is performed at intervals of 1-60 seconds, preferably at intervals of 1-5 seconds.

According to an embodiment, the method comprises generating a representation of the directory environment, and the step of detecting a vulnerability comprises updating the representation using the extracted information relating to the change.

According to an embodiment, the step of generating the representation of the directory environment comprises extracting information relating to all directory objects in the directory environment at a first time before said step of changing a configuration is performed.

According to an embodiment, the method comprises repeating the steps of: changing the configuration, replicating the change with the replication service, extracting the information relating to the change from the replication service, and detecting the vulnerability, until the vulnerability is eliminated.

According to an embodiment, the vulnerability is a control path in the directory environment; and the vulnerability is eliminated when the change closes the control path.

According to an embodiment, the step of extracting the information from the replication service is initiated by a backend system of a security service provider, and the step of detecting the vulnerability is performed by the backend system.

According to an embodiment, the method comprises displaying a warning at the backend system when the vulnerability is detected.

According to a second aspect of the invention, there is provide a system for monitoring a directory environment of a computer network to detect vulnerabilities. The system comprises: one or more processors and one or more computer-readable memories storing computer program code, the one or more processors being configured to execute the computer program code to cause the one or more processors at least to: send instructions to one or more computers on the computer network to extract and return from a replication service information relating to a change of a configuration of the directory environment, and use the extracted information to detect a vulnerability in the directory environment.

According to an embodiment, the instructions cause the one or more computers to extract and return the information from the replication service at intervals of 1-60 seconds, preferably at intervals of 1-5 seconds.

According to an embodiment, the computer program code further causes the one or more processors to perform a step of generating a representation of the directory environment, and the step of detecting a vulnerability comprises updating the representation using the extracted information relating to the change.

According to an embodiment, step of generating the representation of the directory environment comprises sending instructions to the one or more computers to extract and return information relating to all directory objects in the directory environment at a first time before the change of the configuration.

According to an embodiment, the instructions further cause the one or more computers to repeat the step of extracting and returning the information relating to the change from the replication service, and the computer program code further causes the one or more processors to repeat the step of detecting the vulnerability, until the change causes the vulnerability to be eliminated.

According to an embodiment, the vulnerability is a control path in the directory environment; and the vulnerability is eliminated when the change closes the control path.

According to an embodiment, the one or more processors and the one or more computer-readable memories are provided as a backend system of a security service provider.

According to an embodiment, the computer program code further causes the one or more processors to cause a warning to be displayed at the backend system when the vulnerability is detected.

According to a third aspect of the invention, there is provide a system for extracting and returning information from a replication service. The system comprises: one or more processors; and one or more computer-readable memories storing computer program code, the one or more processors being configured to execute the computer program code to cause the one or more processors at least to: extract from the replication service information relating to a change of a configuration of a directory environment, and send the information to a system for monitoring a directory environment of a computer network.

According to an embodiment, the one or more processors; and the one or more computer-readable memories are provided as a client-side system of a security service provider.

According to an embodiment, the computer program code further causes the one or more processors to cause a warning to be displayed at the client-side system responsive to receiving an indication from the system for monitoring the directory environment that a vulnerability is detected.

According to an embodiment of any of the above aspects, the directory environment is an active directory environment.

DETAILED DESCRIPTION

Figure 1A:
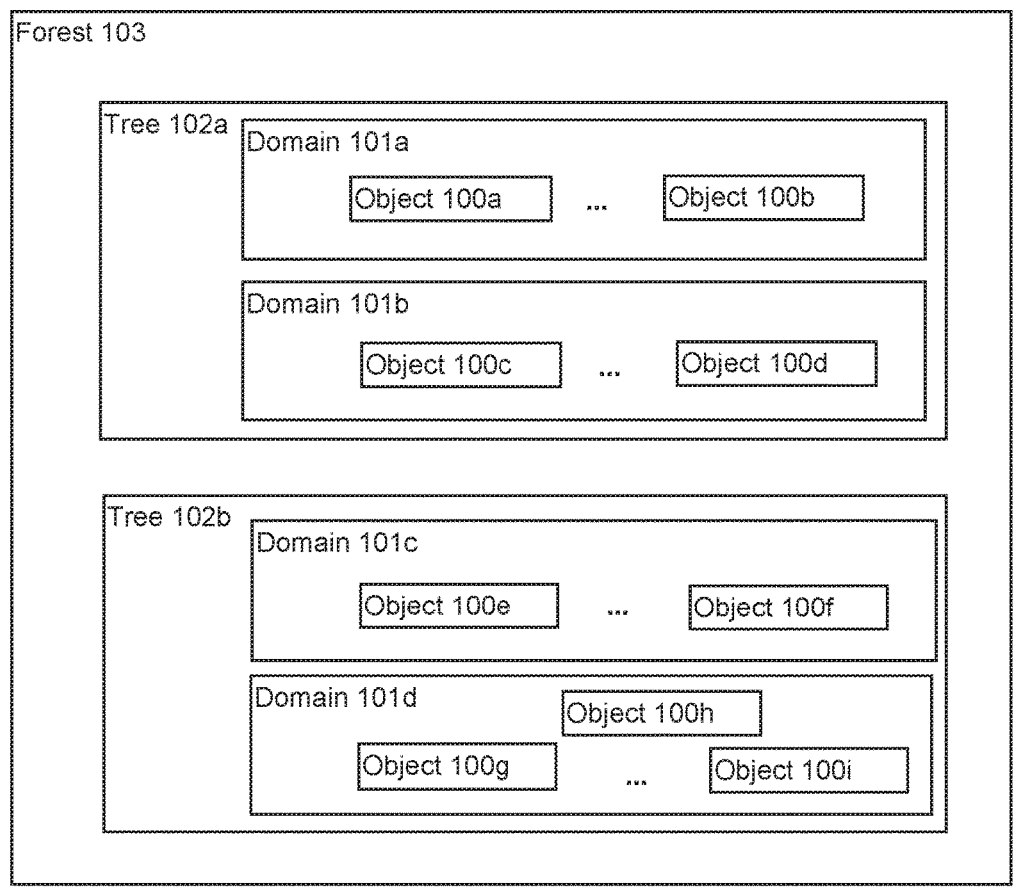
FIG. 1a is schematic representation of a known directory hierarchical structure.
Figure 1B:
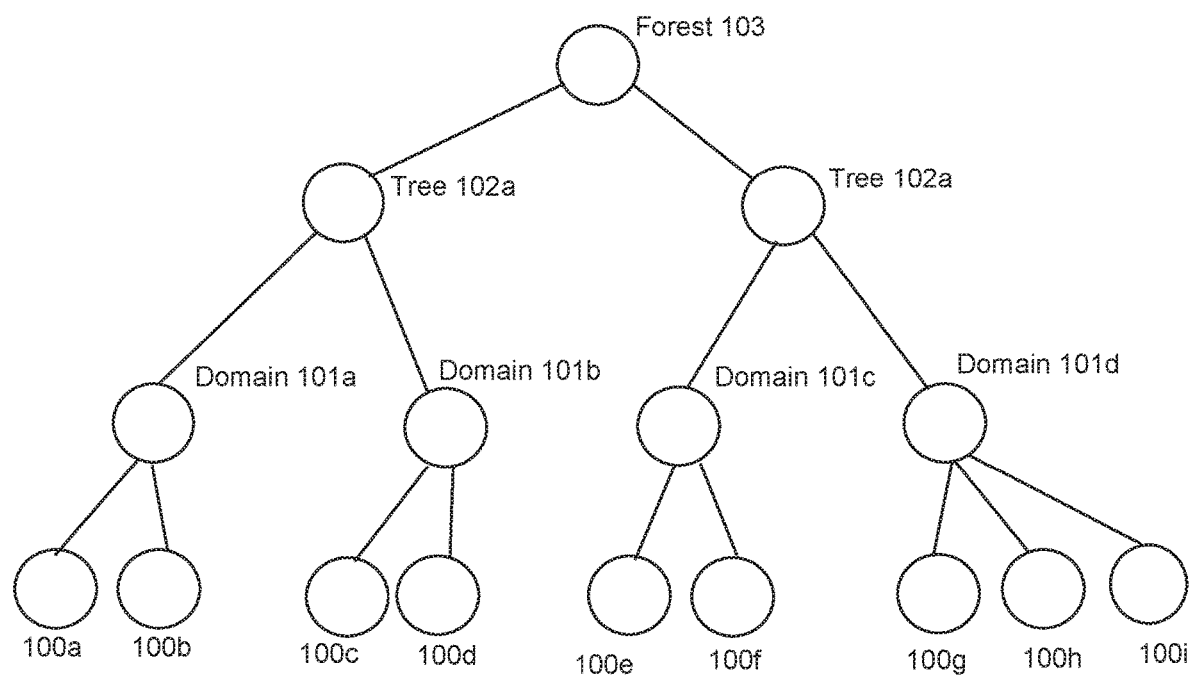
FIG. 1b is an alternative schematic representation of the known directory hierarchical structure of FIG. 1a illustrated using connected nodes.
Figure 2:
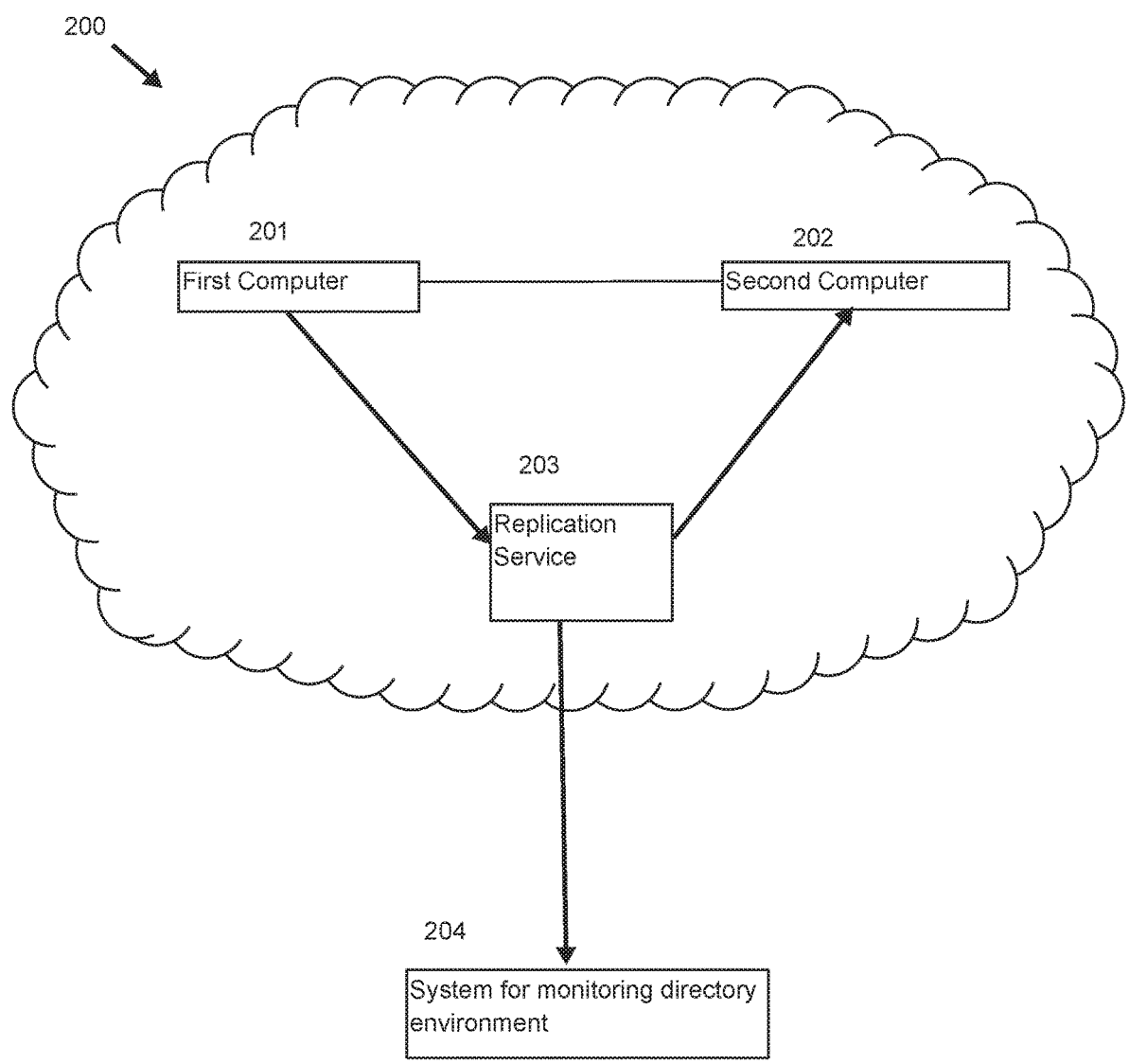
FIG. 2 is a schematic illustration of a computer network according to an embodiment.

FIG. 2 illustrates schematically a computer network 200 to which a first computer 201 and a second computer 202 are connected. For simplicity, only two computers are shown but the computer network 200 may generally have any number of computers and/or other hardware such as servers, printers, routers, mobile devices such as smart phones and laptops, and other devices connected to it. At least one or more devices may optionally be connected to the computer network 200 via the internet or cloud.

Running on the first and second computers 201, 202, and where present any other computers or other hardware, are processes and services which provide an AD environment on the computer network 200. The AD environment and/or objects therein may have a related configuration which may be controlled and changed by a user with administrator privileges. A configuration may refer to, for example, any individual or combination of parameters, settings, access or control privileges, trust policies, object attributes, services, processes, software, schemas, databases and/or other values that may determine and govern the functionality of the AD environment including its databases and executable software. Whilst the description herein refers to AD environments, other directory environments other than AD environments such as, but not limited to, one or more directory environment in systems running Linux OS, IOS, or any other OS, or any combinations thereof are also envisaged. Thus, where AD environments and features of AD environments are referred to herein, it is to be understood that this may refer to any directory environments and their corresponding features as well.

Optionally, the first computer 201 and the second computer 202 may be domain controllers of the AD environment. Domain controllers are servers running a directory domain service which may be used to authenticate and/or authorise users and devices in a directory domain, assign and enforce trust and privilege policies in the domain, store information about members of the domain, and install or update software on computers in the domain.

Also running on the computer network 200 is a replication service 203, such as a domain replication service. The replication service, for example a domain replication service 203 may be run, for example, by server connected to the computer network 2, by one of the first 201 or second computer 202, or by multiple other devices on the computer network 200 in e.g. a distributed manner. When a change is made to the configuration of the AD environment at one computer (e.g. the first computer 201), the replication service 203 replicates the change on other computers and/or hardware on the computer network 200 (e.g. the second computer 202). The replication service 203 may thus be used by the network administrator to conveniently roll out configuration changes to all computers on the AD environment without having to manually replicate the change on every device on the computer network 200.

In the example of FIG. 2, in order to perform the replication, the replication service 203 receives from the first computer 201 information relating to the change of AD configuration, processes it, and replicates the configuration change at the second computer 202, for example by sending a replication message to the second computer 202. The information which passes through the domain replication service 203 thus contains succinct and precise information relating to all changes made to the configuration of the AD environment. Unlike the large volumes of difficult to process data obtained from an LDAP data dump or other "snapshot" technique, the information which passes through the domain replication service 203 is small in volume and is thus easily and quickly processed. The information relating to the change may thus be extracted, for example, by a system 204 for monitoring directory environments, from the domain replication service 203 and used to detect a vulnerability in the directory environment.

Domain replication services have traditionally only been used for data replication between domain controllers, rather than for collecting information relating to vulnerabilities. Using the domain replication service 203 for this purpose is particularly advantageous at least in part because it uses an existing service and thus does not cause any disruption or other downsides to the existing operation of the AD environment, for example by requiring modifications to e.g. LDAP or other processes and services. Further, unlike LDAP data dumps which do not normally require special permissions to perform, the domain replication service 203 typically requires permissions only available to network administrators and not attackers (such as the "replicate directory changes" permission, and permitting access to the domain replication service 203 on a network layer). The above described method thus provides an advantageous tool for defenders which is not available to attackers and which cannot be derived from or emulated with the traditional LDAP data dump and other such "snapshot" techniques.

Figure 3:
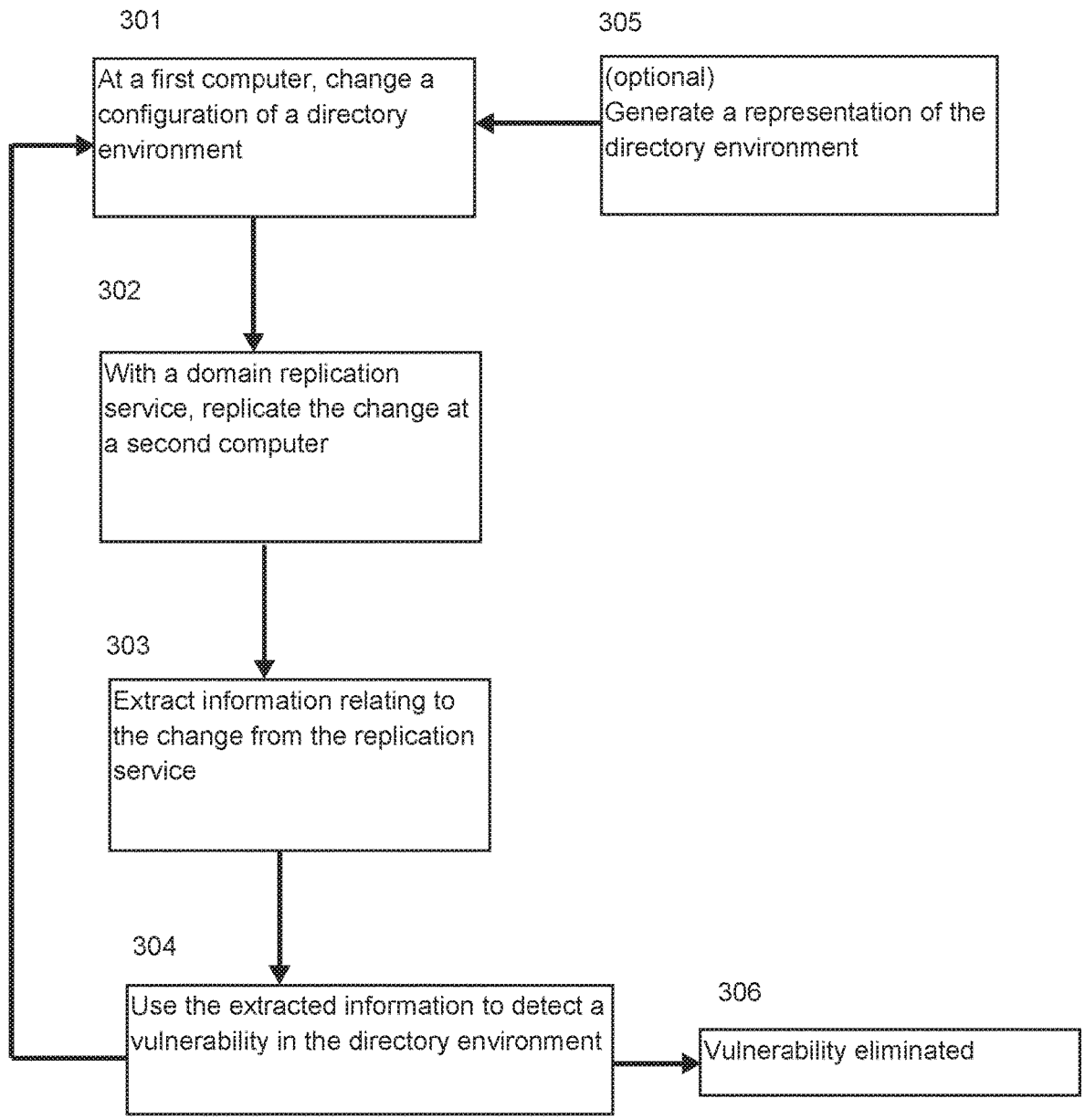
FIG. 3 is a flow diagram illustrating the steps of a method for monitoring a directory environment of a computer network to detect vulnerabilities.

FIG. 3 is a flow diagram illustrating the steps of a method for monitoring a directory environment of a computer network to detect vulnerabilities. In step 301, a configuration of a directory environment is changed at a first computer. In step 302, the change is replicated at a second computer with a domain replication service. In step 303, information relating to the change is extracted from the domain replication service. In step 304 the extracted information used to detect a vulnerability in the directory environment.

As the extracted information is smaller in volume than a typical LDAP data dump, the information may be extracted in much smaller time intervals than is possible with an LDAP data dump. Thus optionally, the step of extracting information 303 from the domain replication service 203 may be performed at intervals of 1-60 seconds, or preferably intervals of 1-5 seconds, 1 second, or less. However, other longer intervals are also envisaged such as intervals of 1-30 minutes, 30-60 minutes, or 1-6 hours, or more. The intervals used may optionally be varied in response to an attack on the computer network 200 being detected. For example, if an attack is detected, the intervals may be made smaller for the duration of the attack in order to provide increased granularity of near real-time information (e.g. every 1 second) during the attack. Once the attack is over, the intervals may be increased again back to pre-attack levels.

Optionally, where the administrator does not already have a full map or representation of the AD environment, a step 305 of generating a representation of the whole AD environment may performed to provide a starting point which may be subsequently updated using the extracted information relating to the AD configuration change. This initial generating of the representation of the AD environment may use an LDAP data dump or other "snap-shot" technique comprising extracting information relating to all AD objects in the AD environment at a first time before any change to the AD configuration is performed. Subsequently extracted information relating to configuration changes may then be used to update the generated representation of the AD environment in a more efficient way than is possible using further LDAP data dumps or other "snapshot" techniques that produce and require the processing of large volumes of data.

Further, as the extracted information is smaller in volume than a typical LDAP data dump and is more efficiently and quickly processed, the updates to the representation of the AD environment may be performed repeatedly and more frequently, for example, at intervals of 1-60 seconds, or preferably intervals of 1-5 seconds, 1 second, or less. However, other longer intervals are also envisaged such as intervals of 1-30 minutes, 30-60 minutes, or 1-6 hours, or more. Thus providing a near real-time representation of the AD environment which reflects any updates in the system in as little as 1-5 seconds or less; something which is unduly burdensome to do with the large volumes of data obtained from LDAP data dumps or other such "snapshot" techniques.

Optionally, the steps of changing 301 the AD configuration, replicating 302 the change with the domain replication service 203, extracting 303 the information relating to the change from the domain replication service 203, and detecting the vulnerability 304 may be repeated until the vulnerability is eliminated 306. Thus providing a means for the network administrator to not only detect a vulnerability in real time, but also to verify in near real-time. (e.g. in intervals of 1-60 seconds, or preferably 1-5 seconds or less)

if a change to the configuration did or did not eliminate a vulnerability, and thus whether or not any further configuration changes are required. This is particularly advantageous when dealing with vulnerabilities that take multiple configuration changes to eliminate and which would otherwise be available for attackers to exploit for much longer periods of time.

By way of example, consider a typical scenario where administrator teams are permitted to modify network configurations only within a specified window during a day (e.g. after working hours). The above described method thus provides a means for security teams to identify problems much more quickly, and a means for the administrators to get a near real-time view of configuration weaknesses to allow immediate verification of fixes within the same approved configuration change window without having to wait until the next day meaning that weaknesses are resolved more quickly, significantly reducing the risk of theft from and/or damage to the computer network.

The vulnerabilities described above may be control paths in the AD environment and may be said to be eliminated when they the change in AD configuration closes and/or disables the control path. Other examples of vulnerabilities which are envisaged include access rights to sensitive information such as user names and passwords, exposed databases, unpatched systems, and other network configurations which may be discovered and exploited by an attacker from information obtained from the AD environment.

Once the information has been extracted, detecting a vulnerability using the extracted information may comprise determining which of a plurality of AD objects in the AD environment has the highest access and control, and/or administrator privileges, determining which of the plurality of AD objects in the AD environment is associated with that AD object, determining what paths exist in the AD environment to that AD object, and determining that a path exists to that AD object to take control of it. It is then up to the network administrator and/or security team to determine what further actions to take. Example further actions may include further changing the AD environment configuration to eliminate and/or close the path to the AD object to prevent it from being accessed and/or controlled via that path.

Optionally, the step 303 of extracting information from the domain replication service 203 and the step 304 of detecting the vulnerability is performed and/or initiated by a backend system of a security service provider, for example over a network layer. Alternatively, these steps 303, 304 may be performed by a client running on a server on the computer network 200, or on the first or second computer 201, 202, or other hardware device on the computer network 200 without requiring external instructions.

Optionally, a warning may be displayed at the backend system (or server, first or second computer, or other hardware device on the computer network where present) when a vulnerability is detected.

Figure 4:
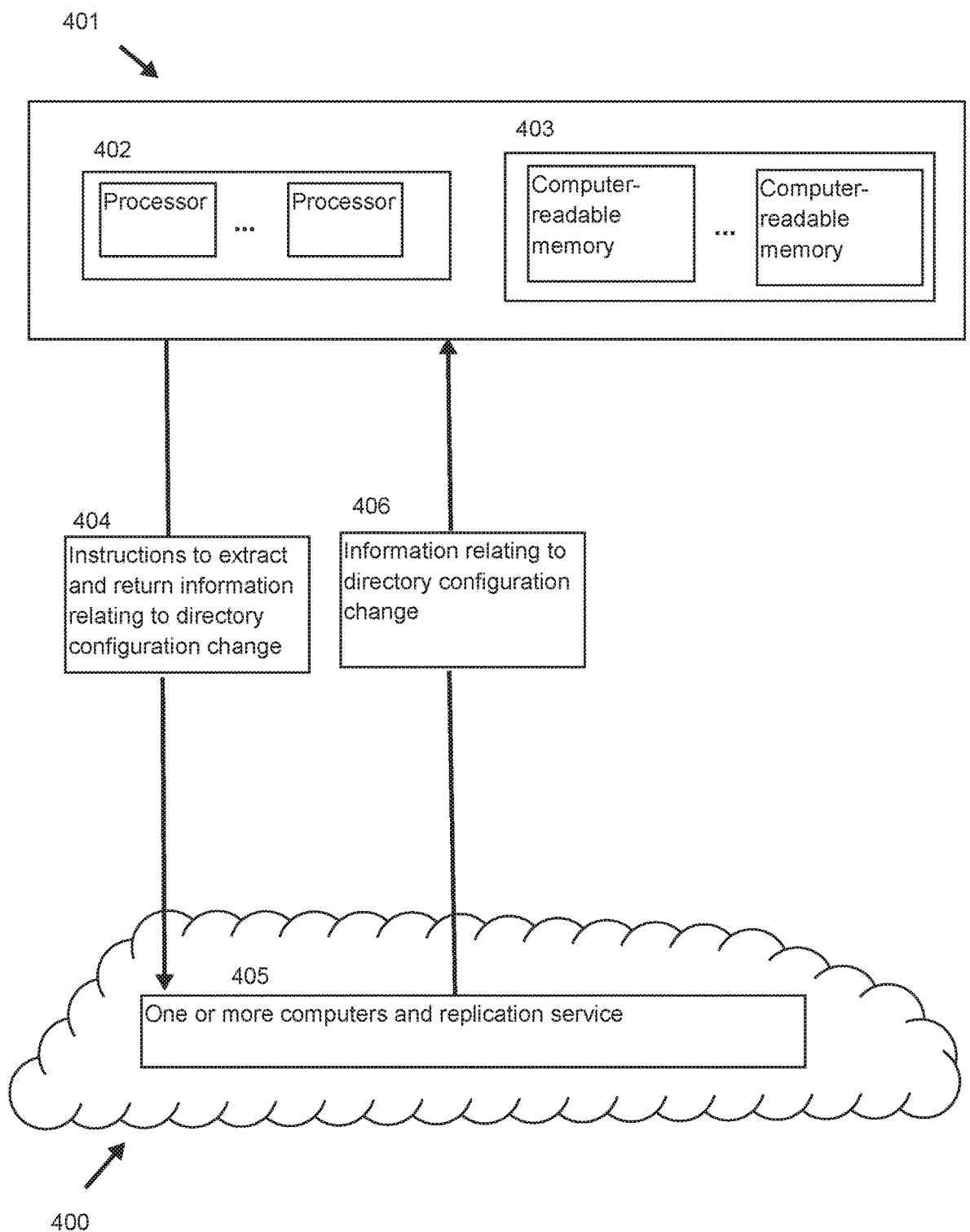
FIG. 4 is a schematic representation of a system for monitoring a directory environment of a computer network to detect vulnerabilities.

FIG. 4 illustrates schematically a system 401 for monitoring a directory environment of a computer network 400 to detect vulnerabilities. The system comprises one or more processors 402 and one or more computer-readable memories 403 storing computer program code, the one or more processors 402 being configured to execute program code to cause the one or more processors at least to send instructions to one or more computers 405 on the computer network 400 to extract and return 406 from a domain replication service, information relating to a change of a configuration of the directory environment.

The instructions may be sent either directly to one or more computers running the domain replication service, or indirectly to the domain replication service by, for example, first being sent to one or more other computers on the computer network which, responsive to those instructions, connects to other computers on the computer network running the domain replication service. For example, in one embodiment, the instructions may be sent to a Windows™ service running on a first computer on the computer network. Responsive to the instructions, the first computer initially connects to a second computer on the computer network which runs the domain replication service (which may be one or more servers) using an appropriate permission such as a "replication directory changes" permission. The information may then be extracted from the domain replication and returned to the system which sent the instructions via the first computer.

In either the direct or indirect case, the domain replication service may optionally include a cookie value in the returned data which provides an indication of when the information was last extracted. The cookie may include a time stamp, counter value, or other means to help distinguish between requests to extract and return information.

In the case where a full representation of the AD environment is not yet available or has not yet been generated, the extracted and returned information includes a current copy of all AD objects as described above. Depending on the available permissions, this may exclude password hashes, or include password hashes. In the case where a cookie is also returned, this will be the first returned cookie and provide the initial timestamp, counter, or other value at which the AD environment is first generated and against which all updates will be made. In particular, for any subsequent requests to extract and return information from the domain replication service, the previous cookie will be attached to the request. The domain replication service may then use the cookie value to ensure that only the changes made since the request identified by that cookie value are returned. The frequency of any follow up requests determines the maximum latency in extracting data may be predetermined by a user. Example intervals are described above.

In accordance with any of the above described methods, once the information is extracted and returned to the system 401, the system 401 uses it to detect a vulnerability in the directory environment of the computer network 400.

The system 401 may optionally be a backend system of a security service provider (as shown in FIG. 4), or may be a server or computer (not shown) on the computer network 400 running suitable client-side software.

The one or more computers 405 illustrated in FIG. 4 thus provide a system for extracting and returning information from a domain replication service which may be used in conjunction with and in an interrelated manner with the above described system 401 for monitoring the directory environment. In particular, the one or more computers 405 may comprise one or more processors (not shown), and one or more computer-readable memories (not shown) storing computer program code, the one or more processors being configured to execute the computer program code to cause the one or more processors at least to, responsive to receiving the instructions 404 from the system 401 for monitoring a directory environment of a computer network 400, extract from the domain replication service information relating to a change of a configuration of the directory environment, and return 406 that information to the system 401 for monitoring. The one or more processors and computer-readable memories may be provided as a client-side system of a security service provider and the instructions may further cause a warning to be displayed at the client side system responsive to receiving an indication from the system for monitoring the directory environment that a vulnerability has been detected.

It will be appreciated that various modifications may be made to the above described embodiments without departing from the scope of the present invention. For example, it is not necessary for the system for monitoring the directory environment to send instructions to initiate the extraction and return of the information relating to the change. Instead, the system for extracting and returning the information is configured to perform the same steps without receiving any specific external instructions to do so. In other words, the computer program code when executed causes the one or more processors at least to extract and send the information to the system for monitoring the directory environment, without being prompted to do so. This may optionally be performed at predetermined intervals such as those described above. An advantage of this is that any opportunity an attacker might have to intercept, block, or reroute instructions is eliminated as there are no such instructions to intercept, block or reroute.

In some cases, the system for extracting and sending the information may be provided by software clients installed on computers on the network, for example as part of a network security client having a number of other network security packages. The information extracted from the domain replication service may then either be sent to the backend system of a the security service provider for further analysis to detect vulnerabilities as described above, and/or it may be retained and stored on the computer from which it was extracted in case it is required later. If it is retained and stored on the computer from which it was extracted, that computer itself may conduct the necessary analysis to detect any vulnerabilities.

The directory environment described above may be an active directory environment of a system of computers running mainly Windows OS or, it may be any other type of directory environment such as, but not limited to, a directory environment in systems running Linux OS, IOS, or any other OS, or any combinations thereof. In particular, the present invention advantageously provides a means provide real time monitoring of these environments to detect vulnerabilities, as described above. Further, whilst a domain replication service is referred to herein, it is envisaged that any other replication service which replicates changes across a directory environment may also be used.

Whilst directory environments have been described above, the invention may also be used at a more general level for database security and anomaly monitoring. In particular, it is envisaged that the invention may be used to monitor any database of a computer network to detect vulnerabilities by, at a first computer on the computer network, changing a value or configuration in or of the database, sending a message to a second computer on the network to replicate the change at the second computer, and extracting from the message information relating to the change, and using the extracted information to monitor changes to the database and thereby detect a vulnerability in the computer network.

Whilst the method described herein has been described as a method, it is envisaged that it may be a computer implemented method.

The invention claimed is:

1. A method for monitoring a directory environment of a computer network to detect vulnerabilities, the method comprising:
    at a first computer on the computer network changing a configuration of the directory environment;
    with a replication service, replicating the change at a second computer on the computer network;
    extracting information relating to the change from a single replication service, the single replication service comprising the replication service;
    detecting a vulnerability in the directory environment from the extracted information; and
    repeating the steps of:
        changing the configuration,
        replicating the change with the replication service,
        extracting the information relating to the change from the replication service, and
        detecting the vulnerability in the directory environment from the extracted information,
        until the vulnerability is eliminated.

2. The method according to claim 1, wherein the first computer is a first domain controller and wherein the second computer is a second domain controller.

3. The method according to claim 1, wherein the step of extracting the information from the replication service is performed at intervals of 1-60 seconds, preferably at intervals of 1-5 seconds.

4. The method according to claim 1, comprising generating a representation of the directory environment, and
    wherein the step of detecting a vulnerability comprises updating the representation using the extracted information relating to the change.

5. The method according to claim 4, wherein the step of generating the representation of the directory environment comprises extracting information relating to all directory objects in the directory environment at a first time before said step of changing a configuration is performed.

6. The method according to claim 1, wherein:
    the vulnerability is a control path in the directory environment; and
    the vulnerability is eliminated when the change closes the control path.

7. The method according to claim 1, wherein the step of extracting the information from the replication service is initiated by a backend system of a security service provider, and
    wherein the step of detecting the vulnerability is performed by the backend system.

8. The method according to claim 7, comprising displaying a warning at the backend system when the vulnerability is detected.

9. A system for monitoring a directory environment of a computer network to detect vulnerabilities, the system comprising:
    one or more processors; and
    one or more computer-readable memories storing computer program code, the one or more processors being configured to execute the computer program code to cause the one or more processors at least to:
        send instructions to one or more computers on the computer network to extract and return from a replication service information relating to a change of a configuration of the directory environment, detect a vulnerability in the directory environment from extracted information from a single replication service, the single replication service comprising the replication service, repeat the steps of:
changing the configuration,
replicating the change with the replication service,
extracting the information relating to the change from the replication service, and
detecting the vulnerability in the directory environment from the extracted information,
until the vulnerability is eliminated.

10. The system according to claim 9, wherein the instructions cause the one or more computers to extract and return the information from the replication service at intervals of 1-60 seconds, preferably at intervals of 1-5 seconds.

11. The system according to claim 9, wherein the computer program code further causes the one or more processors to perform a step of generating a representation of the directory environment, and
wherein the step of detecting a vulnerability comprises updating the representation using the extracted information relating to the change.

12. The system according to claim 9, wherein the computer program code further causes the one or more processors to perform a step of sending instructions to the one or more computers to extract and return information relating to all directory objects in the directory environment at a first time before the change of the configuration.

13. The system according to claim 9, wherein:
the vulnerability is a control path in the directory environment; and
the vulnerability is eliminated when the change closes the control path.

14. The system according to claim 9, wherein:
the one or more processors; and
the one or more computer-readable memories are provided as a backend system of a security service provider.

15. The system according to claim 14, wherein the computer program code further causes the one or more processors to cause a warning to be displayed at the backend system when the vulnerability is detected.

16. A system for extracting and returning information from a replication service, the system comprising:
one or more processors; and
one or more computer-readable memories storing computer program code, the one or more processors being configured to execute the computer program code to cause the one or more processors at least to:
extract from the replication service information relating to a change of a configuration of a directory environment,
detect a vulnerability in the directory environment from extracted information from a single replication service, the single replication service comprising the replication service,
repeat the steps of:
changing the configuration,
replicating the change with the replication service,
extracting the information relating to the change from the replication service, and
detecting the vulnerability in the directory environment from the extracted information,
until the vulnerability is eliminated.

17. The system according to claim 16, wherein:
the one or more processors; and
the one or more computer-readable memories are provided as a client-side system of a security service provider.

18. The system according to claim 17, wherein the computer program code further causes the one or more processors to cause a warning to be displayed at the client-side system responsive to detecting the vulnerability in the directory environment.

19. The method according to claim 1, wherein the directory environment is an active directory environment.

* * * * *